Jan. 30, 1962   J. L. E. MORELLE   3,018,705
SETTING DEVICES FOR PHOTOGRAPHIC APPARATUS
Filed Dec. 28, 1960   2 Sheets-Sheet 1
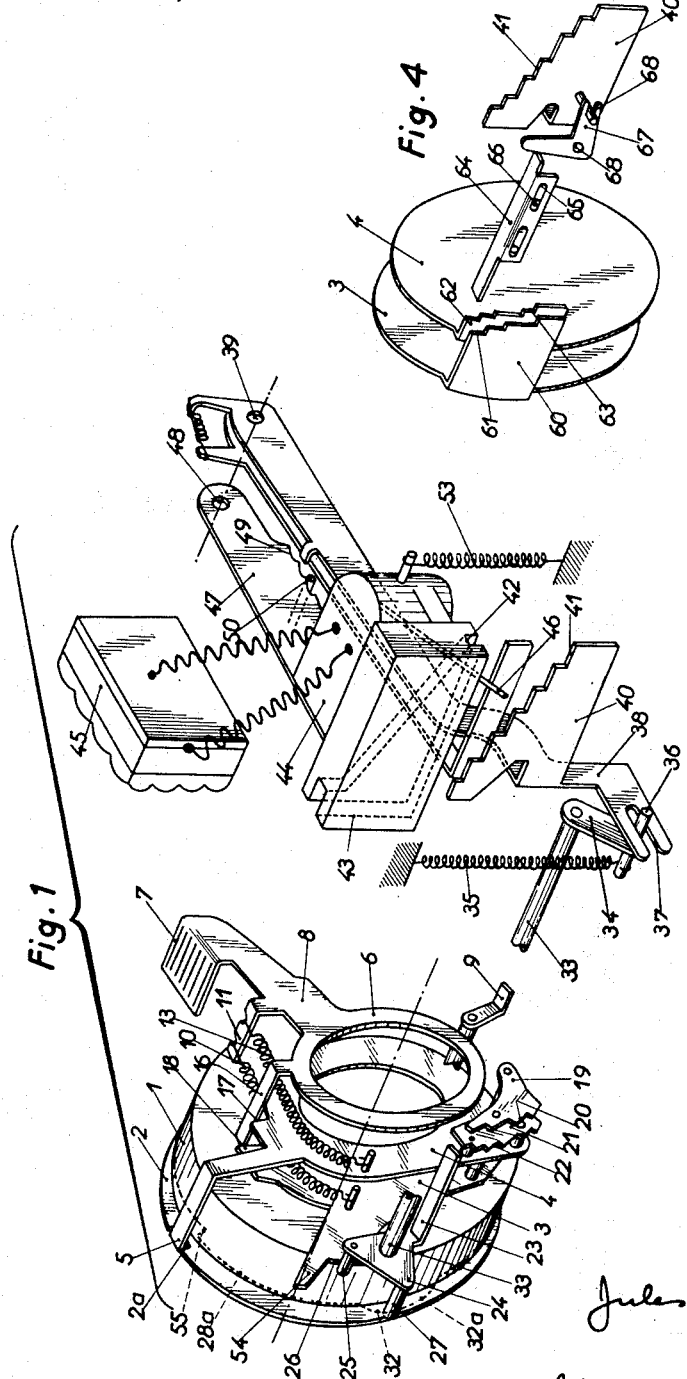

Jan. 30, 1962 J. L. E. MORELLE 3,018,705
SETTING DEVICES FOR PHOTOGRAPHIC APPARATUS
Filed Dec. 28, 1960 2 Sheets-Sheet 2
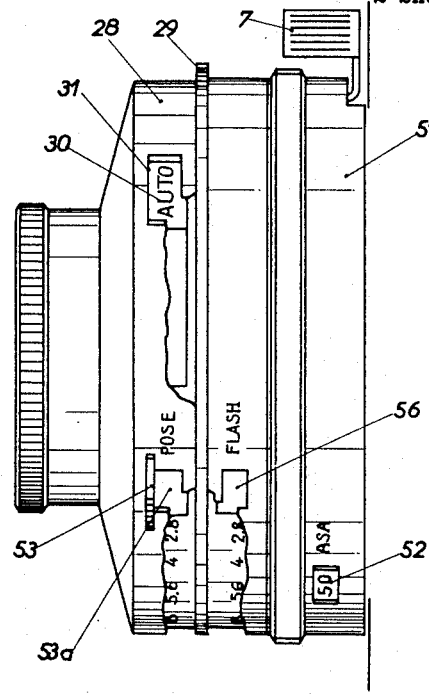
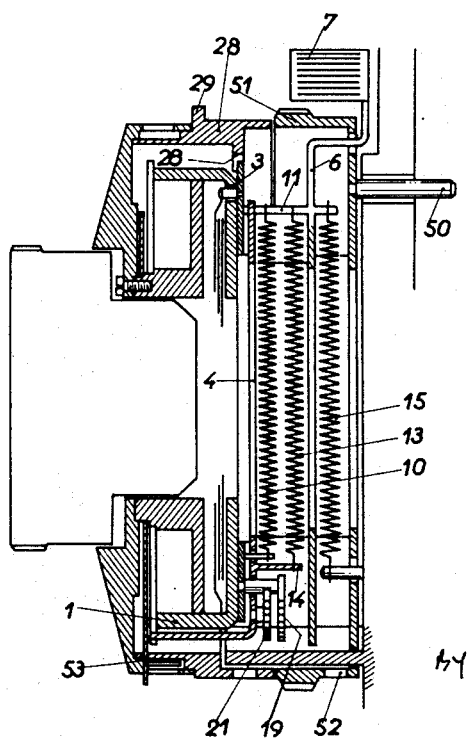
Inventor
Jules Louis Eugene
Morelle
By Michael S. Striker
Attorney

United States Patent Office 3,018,705
Patented Jan. 30, 1962

3,018,705
SETTING DEVICES FOR PHOTOGRAPHIC APPARATUS
Jules Louis Eugène Morelle, Paris, France, assignor to Optique et Precision de Levallois, Levallois-Perret, France, a company of France
Filed Dec. 28, 1960, Ser. No. 78,939
Claims priority, application France Jan. 11, 1960
11 Claims. (Cl. 95—10)

The present invention relates to photographic apparatus of the type incorporating an exposure meter or photoelectric cell. It has for its object a device which enables the user to dispense with the necessity of setting the speed and the diaphragm aperture, these two adjustments being automatically regulated by the exposure meter.

In accordance with one of the particular features of the invention, the members which control the speed and the diaphragm are individually driven with separate angular displacements, until they come up against a movable stop, the position of which is fixed by the exposure meter in dependence on the light intensity, the angular distances travelled by the two members being selected in such manner that there is a suitable correspondence between the value of the speed and the value of the diaphragm opening determined by the meeting with the movable stop.

The assembly of the members controlling the speed and the diaphragm is preferably driven in rotation by an operating knob at the disposal of the user, this knob continuing its travel after the said members are stopped by the abutment member, the position of which is determined by the exposure meter, so as to act on the release of the photographic shutter.

In accordance with a further particular feature of the invention, the position of the movable stop or abutment is determined by a feeler of the stepped type, in contact with the needle of the galvanometer of the built-in exposure meter.

In accordance with another feature of the invention, a particular arrangement of the controls permits of a much simplified use of the apparatus for an ordinary exposure or a flash. Thus, for the use of a flash, it is only necessary to set the desired value of the diaphragm aperture, means being then provided for locking the movable stop in a given position so that the speed-control member comes into contact with the movable stop at a value of the speed fixed during manufacture, whereas the travel of the diaphragm control member is limited to the value corresponding to the set value referred to.

The description which follows below with reference to the accompanying drawings (which are given by way of example only and not in any limitative sense) will make it quite clear how the invention may be carried into effect, the special features which are brought out, either in the text or in the drawings, being understood to form a part of the said invention.

FIG. 1 is a perspective view of the setting device according to the invention;

FIG. 2 is a side view showing the exterior of the lens shutter unit, fixed on the front of the casing of the apparatus;

FIG. 3 is a view in axial cross-section corresponding to FIG. 2;

FIG. 4 is a partial view in perspective of an alternative form of construction of the setting of the moving stop.

In FIG. 1, there is shown at 1 a lens shutter of known type, which comprises particularly a ring 2 which carries the speed cam and a diaphragm control 3 which also has the general shape of a ring.

The speed ring 2 is coupled to a ring 4 by means of a finger 5, one extremity of which is rigidly fixed to the said ring while the other extremity is engaged in a notch 2a formed in the ring 2.

A ring 6 carries an operating knob 7 on the outside of the apparatus, and provided with a heel 8 which acts on a shutter-release 9 when sufficient pressure is applied to the said knob, that is to say when the ring 6 is turned through a sufficient angle.

The ring 6 is coupled to the ring 3 by a spring 10, the extremities of which are fixed on lugs 11 and 12 carried respectively by the two rings. It is also coupled to the ring 4 by a spring 13, the extremities of which are respectively fixed to the stud 11 on the ring 8 and a stud 14 on the ring 4.

A spring 15 (see FIG. 3) returns the operating knob 7 to its top position, in which an arm 16, rigidly fixed to the ring 6, comes into abutment against shoulders 17, 18 of the ring 3 and the ring 4 respectively.

The ring 3 carries a segment 19 provided with notches 20. In the same way, the ring 4 carries a segment 21 having notches 22. The notches 22 of the two segments are intended to co-operate with the nose 23 of a pawl 24. This pawl carries a first finger 25 in contact with a shoulder 26 of the diaphragm ring 3, and a second finger 27 in contact with the internal profile 28a of a ring 28 or setting ring. For the sake of clearness, only a portion of the internal profile of this ring has been shown in dotted lines in FIG. 1. This ring 28, which can be operated from the exterior by a knurled segment 29, enables the apparatus to be used on automatic operation or for ordinary exposure, depending on the angular position which is given to the said ring. Automatic working is obtained when the corresponding indication 30 is visible in a small window 31 formed in the hood of the apparatus. To this end, the internal profile 28a of the setting ring has a sloping face 32 leading to a concave portion 32a. This sloping face acts on the finger 27 of the pawl 24 either to lock it in position or to release it partially.

The angular position of the pawl 24 is determined by the indications given by a photo-electric cell incorporated in the apparatus.

In accordance with one preferred form of embodiment, the pawl 24 carries a rod 33 parallel to its axis of rotation, at the end of which rod is fixed a crank-pin 34, controlled by a spring 35 and provided with a nipple 36 engaged in a groove 37 of a lever 38. This lever pivots about an axis 39 parallel to the rod 33, and has a perpendicular face 40 provided with an edge having a stepped profile 41. When the lever pivots, the edge 41 of the face 40 is engaged in a groove 42 formed in a parallelepiped body 43 rigidly fixed to a galvanometer 44, which is supplied from a photo-electric cell 45 incorporated in the casing of the apparatus. The free extremity of the needle 46 of the galvanometer moves between the parallelepiped body opposite the groove 42, and a plate 43 coupled to the galvanometer so as to define an opening which enables the needle 46 to pivot in a plane perpendicular to the plane of the face 40 of the lever.

In addition, the galvanometer 44 is carried by a lever 47 pivotally mounted on a shaft 48 which is coincident with the axis 39 of the lever 38 of the feeler, or is at least in the vicinity of the said axis. The lever 47 is provided with notches 49 in contact with the foot 50 of a ring 51 which registers the sensitivity of the film employed (see FIG. 2). This ring, which partially surrounds the casing, comprises a window 52 through which are shown the graduations of sensitivity carried by the casing. A spring 53 arranged between a fixed point of the apparatus and the galvanometer, maintains the profile 49 constantly in contact with the foot 50 of the sensitivity setting ring.

When the sensitivity of the film used in the apparatus is registered by means of the ring 51, the foot 50 carried by the said ring is brought into one of the notches of the profile 49, which amounts to changing the inclination of the lever 47 carrying the galvanometer, and in consequence to modifying the position of the plane of contact of the needle 46 of the said galvanometer with respect to the stepped feeler 40.

The profile 49 is formed in such manner that for each change in sensitivity of the film, the variation of the level of the plane of the needle 46 displaces the speed and diaphragm setting (as will now be described) corresponding to the new sensitivity.

The apparatus which has just been described operates in the following manner:

In order to obtain an automatic adjustment of the exposure time, the outer ring 29 is first rotated until the indication "Automatic" appears in the window 30, this having the effect of bringing the finger 27 of the pawl 24 into the concavity 32a formed in the interior of the said ring, and the pawl is then only retained by the shoulder 26 of the ring 3.

By pressing the operating knob 7, the ring 6 is caused to rotate, this latter ring driving the diaphragm control ring 3 and the ring 4 coupled to the speed control, by the intermediary of the springs 10 and 13. The shoulder 26 leaves the finger 25 of the pawl, which can then rotate freely. Under the action of the spring 35, the crank pin 34 pivots and rotates the lever 38 in such manner that the stepped profile 41 makes contact with the needle 46 of the galvanometer giving the indications of the photoelectric cell 45. As indicated above, the position of the plane of contact of the needle is determined in accordance with the sensitivity of the film employed, by previously regulating the angular position of the outer ring 51.

The pawl 24, driven by the rod 33 rigidly fixed to the crank-pin 34, thus takes up an angular position which depends on that of the notches 41 of the feeler which is in contact with the needle 46 of the galvanometer, that is to say it takes up a position which depends on the deflection of the said needle and which corresponds to the light intensity indicated by the photo-electric cell, having regard to the sensitivity of the film employed.

One of the notches 22 of the segment 21 of the ring 4 coupled to the speed ring 3 comes into abutment against the nose 23 of the pawl and one of the notches 20 of the segment 19 of the diaphragm control ring comes into abutment against this same nose 23.

It is of course understood that the travel of the rings 3 and 4 may be different, depending on the profile given to the notches 20 and 22. This profile of the notched segments is formed in such manner that, for every angular position of the pawl 24, the setting of the speed and the diaphragm is effected by a variation of the adjustment of light intensity, hence, for the lowest light intensity with the diaphragm wide open and the slowest speed, to the closed diaphragm and at the highest speed for the highest light intensity. The choice of the speed-diaphragm setting for each light intensity is made at the time of manufacture.

By way of indication, the following relation can be chosen for a shutter covering the speeds of $1/30$ to $1/250$ of a second and a lens with an aperture from $f2.8$ to $f22$:

| Light intensity index | Speed | Diaphragm |
| --- | --- | --- |
| 8 | $1/30$ | 2.8 |
| 9 | $1/30$ | 4 |
| 10 | $1/60$ | 4 |
| 11 | $1/60$ | 5.6 |
| 12 | $1/125$ | 5.6 |
| 13 | $1/125$ | 8 |
| 14 | $\{1/125, 1/250\}$ | 11 |

It can therefore be seen that the control rings for the speed and the diaphragm each have their own segment provided with notches and are independent. The choice of different values of the speed and of the diaphragm is thereby facilitated, and the adaptation of standard lens shutters is simple, since their speed range can be retained.

A construction of this kind is possible by virtue of the device by means of which the angular indications of light intensity given by the needle 46 of the galvanometer are transformed into angular displacements of the nose 23 of the pawl 24, the profiles of the notched segments again converting to angular values the rotation of the speed ring 2 and the diaphragm ring 3.

Thus, the independent rings 3 and 4 are immobilized one after the other, or simultaneously as the case may be, by coming up against the nose of the pawl, while the heel 8 of the ring 6, directly controlled by the operating knob 7, continues its travel and acts on the release 9 of the shutter.

The spring 15 brings back the mechanism into its initial position as soon as the user ceases to act on the knob 7. In particular, the shoulder 26 of the ring 3 comes into action on the feeler 25 of the pawl, which pivots in such manner that it causes the stepped profile 41 associated with the lever 38 to move downwards, thereby freeing the needle 46 of the galvanometer. The latter can pivot freely in order to give a new indication of the light intensity for the purposes of a subsequent operation.

In this way, there is obtained an automatic adjustment of the speed and of the diaphragm aperture of the lens, simply by pressing on the operating knob of the release.

In addition to this automatic adjustment, a special arrangement enables the apparatus to be utilized for ordinary exposure. To this end, a lever 53 (FIG. 3) controls the sloping face which selects the exposure of the shutter. During this operation, the lever 53 opens the indicator 53a marked "Exposure" (see FIG. 2). By rotation of the ring 28, the user then registers the selected diaphragm in the exposure window. As soon as this ring leaves the automatic position, the action of the pawl 24 on the segments 19 and 21 is cancelled by the finger 27 of the pawl and the sloping face 32 of its internal profile, and a stop 55 is inserted in the path of a nose 54 carried by the ring 3, the stop 55 limiting the angular travel of the ring 3 to the value of the diaphragm indicated in the exposure window.

In addition, the indicator ring 28 is also provided with a window 56 marked "Flash" which covers a scale graduated in diaphragm values. As soon as the ring 28 is rotated in order to register the selected diaphragm in the window 56, the sloping face 32, acting on the finger 27 of the pawl, gives to this latter an angular position such that it stops the ring 4, which is coupled to the speed ring 2, at a determined position, for example at $1/30$ of a second, and cancels all action on the segment 21 carried by the diaphragm control ring 3. The setting in position of the diaphragm aperture is fixed, as in the case of exposure, by the action of the stop 55 on the nose 54 carried by the diaphragm control ring 3.

It can thus be seen that in the case of the use of a flash, it is only necessary to register the desired diaphragm in the corresponding indicator 56, the shutter remaining automatically set at a given speed, for example $1/30$ of a second. This device for the use of the flash constitutes an alternative system to that in which it is necessary to register, not the diaphragm opening, but the distance from the apparatus to the subject. This device is simple for the user but it necessitates the use of a flash lamp of a certain type and also of a timing device ensuring an advance ignition of the lamp, the shutter being required to operate in accordance with the distance registered, at speeds ranging for example from $1/30$ to $1/250$ of a second. The arrangement which has been described above according to the present invention enables a single speed to be ensured whatever diaphragm opening is registered for the flash exposure, and makes it possible to return to the standard system of registration of the diaphragm by the guide number, thus avoiding the complications of construction of the prior arrangement.

It will of course be understood that a large number of modifications may be made to the form of embodiment which has just been described, without thereby departing from the scope of the present invention.

Thus, the limitation of the angular travel of the rings 3 and 4 in dependence on the position of the stepped feeler 41 may be effected as indicated in FIG. 4.

In this form of embodiment, the rings 3 and 4 each carry substantially tangential segments 60 and 61 provided with notches 62 and 63 respectively. The stop is not constituted in this case by a nose carried by a pivoted pawl, but by a rod 64 sliding parallel to the optical axis of the apparatus. To this end, the rod may be provided with oblong holes 65, through which pass studs 66 fixed to the frame of the apparatus. One of the arms of a cranked lever 76 pivoting about a fixed axis 68, is applied against one extremity of the rod 64, while the other arm of the said lever comprises a groove in which is engaged a nipple 69 rigidly fixed to the plate 40 of the stepped feeler 41.

Any displacement of the feeler 41 causes the lever 67 to pivot and thus pushes back the rod 64 by an amount corresponding to the deflection of the needle of the galvanometer. There is thus obtained a movable stop 64 which plays the same part as the nose 23 of the pawl 24.

In conclusion, three indicators are at the disposal of the user:

The indicator 31: it is only necessary to register the indication "Automatic" in this indicator by means of the ring 28, in order that the adjustment of the exposure time is effected automatically at each release;

The indicator 53a for registering the exposure: the user who wishes to make use of the "exposure" position opens the indicator 53a by means of the lever 53 and registers in it the value of the diaphragm aperture selected;

The indicator 56 for the use of the flash: it is only necessary to register in this indicator the value of the diaphragm, the shutter remaining automatically set at a given speed, 1/30 of a second for example.

In addition, the ring 51 enables the sensitivity of the film employed to be registered in the indicator 52.

What I claim is:

1. In a photographic apparatus having a built-in exposure meter comprising a photo-electric cell and an associated needle galvanometer, and including in particular a member controlling the speed of opening of the lens, a member for controlling the lens diaphragm and a photographic shutter provided with a release, a device for automatically adjusting the exposure time comprising a movable stop, a first means coupling said exposure meter to said movable stop, the position of which is fixed by said exposure meter in dependence on the light intensity, a second means for causing said speed control member and said diaphragm control member to pivot separately with independent angular distances of travel up to the point of contact with said movable stop, said angular distances of travel of the two said control members being determined in such manner that there is a suitable correspondence between the value of the speed and the value of the diaphragm aperture determined at the point of contact with said movable stop.

2. A device as claimed in claim 1, in which said second means is constituted by an operating knob at the disposal of the user and coupled by elastic members to the speed control member and to the diaphragm control member, said knob continuing its travel after the said control members have been immobilized by said stop, so as to act on said release of the photographic shutter.

3. A device as claimed in claim 1, in which said first means comprises a feeler detecting the position of said galvanometer needle in order to fix the position of said movable stop.

4. A device as claimed in claim 3, and further comprising a member associated with said galvanometer, said member being provided with a slot in front of which said galvanometer needle moves, said feeler having a stepped profile located in the plane of said slot perpendicular to the plane of the needle, whereby the said needle forms a stop against one of the notches of said stepped profile of the feeler.

5. A device as claimed in claim 3, and further comprising a pivot about which said exposure meter is adapted to pivot, and means for displacing said exposure meter in dependence on the sensitivity of the film employed in order to determine the position of the plane of contact of said galvanometer needle with respect to said feeler.

6. A device as claimed in claim 3, and further comprising means for locking said stop when no action is effected on said operating knob, whereby said feeler frees the galvanometer needle.

7. A device as claimed in claim 1, and further comprising means for eliminating said stop when it is desired to utilize said apparatus for ordinary exposure, and for limiting the angular travel of said diaphragm control member to a selected value.

8. A device as claimed in claim 1, and further comprising means for locking said movable stop in a given position, enabling the apparatus to be used with a flash, in such manner that said speed control member comes into contact against said stop at a value of speed fixed during manufacture, but that the travel of said diaphragm control member is limited to a value determined by the user.

9. A device as claimed in claim 1, in which said diaphragm control member is a ring carrying a segment provided with notches, while said speed control member is coupled to a further ring also carrying a segment provided with notches.

10. A device as claimed in claim 4, comprising a pawl carrying said movable stop, a crank-pin co-operating with said feeler, the position of said pawl being determined by said crank-pin.

11. A device as claimed in claim 3, in which said movable stop is constituted by a sliding rod driven in lateral movement by a lever actuated by said feeler.

References Cited in the file of this patent

UNITED STATES PATENTS

| | | |
|---|---|---|
| 2,868,095 | Gebele | Jan. 13, 1959 |
| 2,960,016 | Distel | Nov. 15, 1960 |
| 2,981,164 | Durst | Apr. 25, 1961 |
| 2,984,165 | Erlichman | May 16, 1961 |